(12) United States Patent
Lipps et al.

(10) Patent No.: US 7,600,803 B2
(45) Date of Patent: Oct. 13, 2009

(54) WINDSHIELD WIPER, ESPECIALLY FOR A MOTOR VEHICLE

(75) Inventors: Verena Lipps, Baden-Baden (DE); Paul Geubel, Baden-Baden (DE)

(73) Assignee: Robert Bosch GmbH (DE)

( * ) Notice: Subject to any disclaimer, the term of this patent is extended or adjusted under 35 U.S.C. 154(b) by 98 days.

(21) Appl. No.: 11/547,618

(22) PCT Filed: Feb. 14, 2005

(86) PCT No.: PCT/EP2005/050635
§ 371 (c)(1),
(2), (4) Date: Apr. 3, 2007

(87) PCT Pub. No.: WO2005/097564
PCT Pub. Date: Oct. 20, 2005

(65) Prior Publication Data
US 2007/0209137 A1    Sep. 13, 2007

(30) Foreign Application Priority Data
Apr. 6, 2004    (DE) ..................... 10 2004 016 914

(51) Int. Cl.
*B60S 1/02* (2006.01)
(52) U.S. Cl. .................. 296/96.17; 15/250.31
(58) Field of Classification Search ............ 15/250.001; 296/96.15, 96.17
See application file for complete search history.

(56) References Cited

U.S. PATENT DOCUMENTS

| | | | | |
|---|---|---|---|---|
| 5,274,875 | A * | 1/1994 | Chou | 15/250.19 |
| 5,949,206 | A * | 9/1999 | Oruganty et al. | 318/280 |
| 6,027,157 | A * | 2/2000 | Epple | 296/96.15 |
| 6,532,616 | B1 * | 3/2003 | Eustache | 15/250.31 |
| 6,705,660 | B2 * | 3/2004 | Muehlpforte et al. | 296/96.15 |
| 6,902,221 | B2 * | 6/2005 | Egner-Walter et al. | 296/96.17 |
| 7,144,065 | B2 * | 12/2006 | McClure et al. | 296/146.8 |
| 7,503,615 | B2 * | 3/2009 | Albrecht et al. | 296/96.15 |
| 2003/0074761 | A1 * | 4/2003 | Neubauer et al. | 15/250.31 |

(Continued)

FOREIGN PATENT DOCUMENTS

DE        2431110 A * 1/1976

(Continued)

*Primary Examiner*—Glenn Dayoan
*Assistant Examiner*—Paul A Chenevert
(74) *Attorney, Agent, or Firm*—Michael Best & Friedrich LLP

(57) ABSTRACT

A windshield wiper device (10), in particular for a motor vehicle, with at least one drive element (16) having an output shaft (28), which drive element is to be fastened to the vehicle body (26), and at least two fastening elements (22), which are able to engage in receptacle openings (24) on the vehicle body (26) and each having at least one damping element (36) for damping mechanical vibrations. It is proposed that the damping element (36) is firmly connected to the fastening element (22) and can be inserted into the receptacle openings (24) in a first assembly direction (30) and via a rotational movement in a second assembly direction (32) transverse to the first edge (80) of the receptacle opening (24) overlaps with a slot (40), wherein the slot (40) is arranged in a component (38, 64), which has a surface that is hard relative to the damping element (36) and is firmly connected to the damping element (36).

11 Claims, 4 Drawing Sheets

U.S. PATENT DOCUMENTS

| | | | |
|---|---|---|---|
| 2005/0218688 A1* | 10/2005 | Neubauer et al. | 296/96.17 |
| 2007/0011839 A1* | 1/2007 | Princet et al. | 15/250.31 |
| 2007/0278873 A1* | 12/2007 | Macaire | 310/71 |
| 2008/0017457 A1* | 1/2008 | Ach et al. | 187/409 |
| 2008/0052863 A1* | 3/2008 | Albrecht et al. | 15/250.31 |
| 2008/0209659 A1* | 9/2008 | Ritt | 15/250.31 |
| 2008/0216275 A1* | 9/2008 | Collinet et al. | 15/250.31 |

FOREIGN PATENT DOCUMENTS

| | | |
|---|---|---|
| DE | 198 33 404 | 1/2000 |
| DE | 100 62 617 | 5/2002 |
| FR | 2 770 880 | 5/1999 |
| FR | 2 842 154 | 1/2004 |
| FR | 2842154 A1 * | 1/2004 |
| WO | WO 00/06429 | 2/2000 |
| WO | WO 03/097419 | 11/2003 |
| WO | WO 2004065186 A1 * | 8/2004 |

* cited by examiner

WINDSHIELD WIPER, ESPECIALLY FOR A MOTOR VEHICLE

BACKGROUND OF THE INVENTION

The invention starts from a windshield wiper device, in particular for a motor vehicle.

Numerous windshield wiper devices for motor vehicles are known that have a drive element fastened to the body of the motor vehicle. Typically, these types of drive elements are screwed down to the vehicle body, which, however, is very expensive and necessitates a lot of parts such as screws, screw nuts and washers, etc. This is logistically complicated as well as complex in terms of installation. In addition, a windshield wiper device is known from DE 100 62 617 A1, which is glued into the motor vehicle, whereby the adhesive has damping properties.

A windshield wiper system for vehicles, particularly motor vehicles, is known from DE 198 33 404 A1, which makes assembly without screws possible and is therefore quick and simple to perform. To do this, the windshield wiper system features a supporting structure for a drive device. A number of first fastening elements are provided on the supporting structure, which project from the supporting structure in a first direction. A number of second fastening elements project in a second direction running at an angle between 45 and 135 degrees to the first direction, preferably at an angle of 90 degrees. The fastening elements are embodied as cylindrical plug pins, whose one end is connected to the supporting structure and whose free end is inserted into a receptacle opening of a rubber elastic damping element. This is inserted into an assembly opening of the vehicle body. The assembly opening can be located in a bent or deep-drawn bracket, which is welded onto the vehicle body. The free end of the plug pin can have a preferably conical thickening in order to be able to fix said end in the damping element by locking. Since the assembly directions of the first and second fastening elements run at one angle, it cannot be ruled out that the supporting structure will be subjected to stress after assembly, which is transmitted to adjacent parts of the vehicle body.

SUMMARY OF THE INVENTION

According to the invention, the damping element is firmly connected to the fastening element. It can be inserted into the receptacle opening in a first assembly direction and overlaps a slot via a movement in a second assembly direction transverse to the first edge of the receptacle opening. This slot is arranged in a component, which has a surface that is hard relative to the damping element, and is firmly connected to the damping element. Low assembly forces are produced in the second assembly direction due to the low coefficient of friction between the hard surface of the slot and the vehicle body so that the windshield wiper device in accordance with the invention can be mounted without a great expenditure of force. The slot has an expansion at its opening so that the edge of the receptacle opening can be inserted easily into said slot.

At the end of the second assembly path, the windshield wiper device must, as a rule, be fixed in the final position so that the fastening element with the damping element cannot detach again in the opposite direction. For this purpose, a locking element, e.g., in the form a pin or a screw, can be provided, which is arranged in the first assembly direction and connects the drive element to the vehicle body. It also expediently features vibration damping measures. However, this represents a high expense in terms of manufacturing and assembly. According to an embodiment of the invention, it is proposed in contrast to this that the bow have two legs running essentially parallel, which delimit the slot and one of which has a locking nose, which engages in an opening of the opposing leg. During assembly in the second assembly direction, the locking nose is pressed back on the edge of the receptacle opening through the body panel and, when it reaches the final position, locks into place in a corresponding locking opening of the panel body. In order to be able to press back the locking nose easily, it has a flatter flank in the second assembly direction while a steeper flank of the locking nose opposing the second assembly direction makes sure that the end position is locked securely. For disassembly, the locking nose can be pressed back starting from the flatter flank by means of a screw driver.

According to another embodiment of the invention, the bow has a second locking nose, which lies behind the first locking nose in the second assembly direction and engages in an opening of the opposing leg with two steep flanks that run transverse to the second assembly direction. During assembly, the second locking nose also engages in a snap-in hole of the vehicle body. While both locking noses can be disengaged via the flat flank of the first locking nose and the first locking nose roughly positions the windshield wiper device in the final position, the second locking nose makes more exact positioning of the windshield wiper device relative to the corresponding snap-in hole in the vehicle body possible. In this case, the second locking nose advantageously has an M-shaped or W-shaped form in the longitudinal section of the bow.

The bow, which is expediently fabricated of plastic or sheet metal, can be pressed, glued, cast in, vulcanized or held positively engaged in a free space of the damping element. The slot of the bow is advantageously adapted to the thickness of the body panel or a holder in such a way that, in an assembled state, the body panel is adjacent to the inner sides of the bow under initial stress.

In another embodiment, a holding element made of plastic is inserted into a free space of the damping element, which holding element has a slot for the receptacle of the body panel, wherein one side of the slot has a locking nose, which projects into an indentation on the opposing side of the slot. The holding element can be divided in the second assembly direction in the area of the slot and can be fastened with its outer sides on the damping element. If the slot is slid over the edge of the receptacle opening, both parts are pressed apart, whereby the damping element yields elastically. When the final position is reached, the locking nose locks into place in a corresponding locking opening of the vehicle body. In this case, it is also expedient for the slot to be expanded on its outer end in the second assembly direction.

BRIEF DESCRIPTION OF THE DRAWINGS

Additional advantages are yielded from the following description of the drawings. Exemplary embodiments of the invention are depicted in the drawings. The drawings, the description and the claims contain numerous features in combination. The person skilled in the art will also observe individual features expediently and combine them into additional, meaningful combinations.

The drawings show.

DETAILED DESCRIPTION

Figure 1:
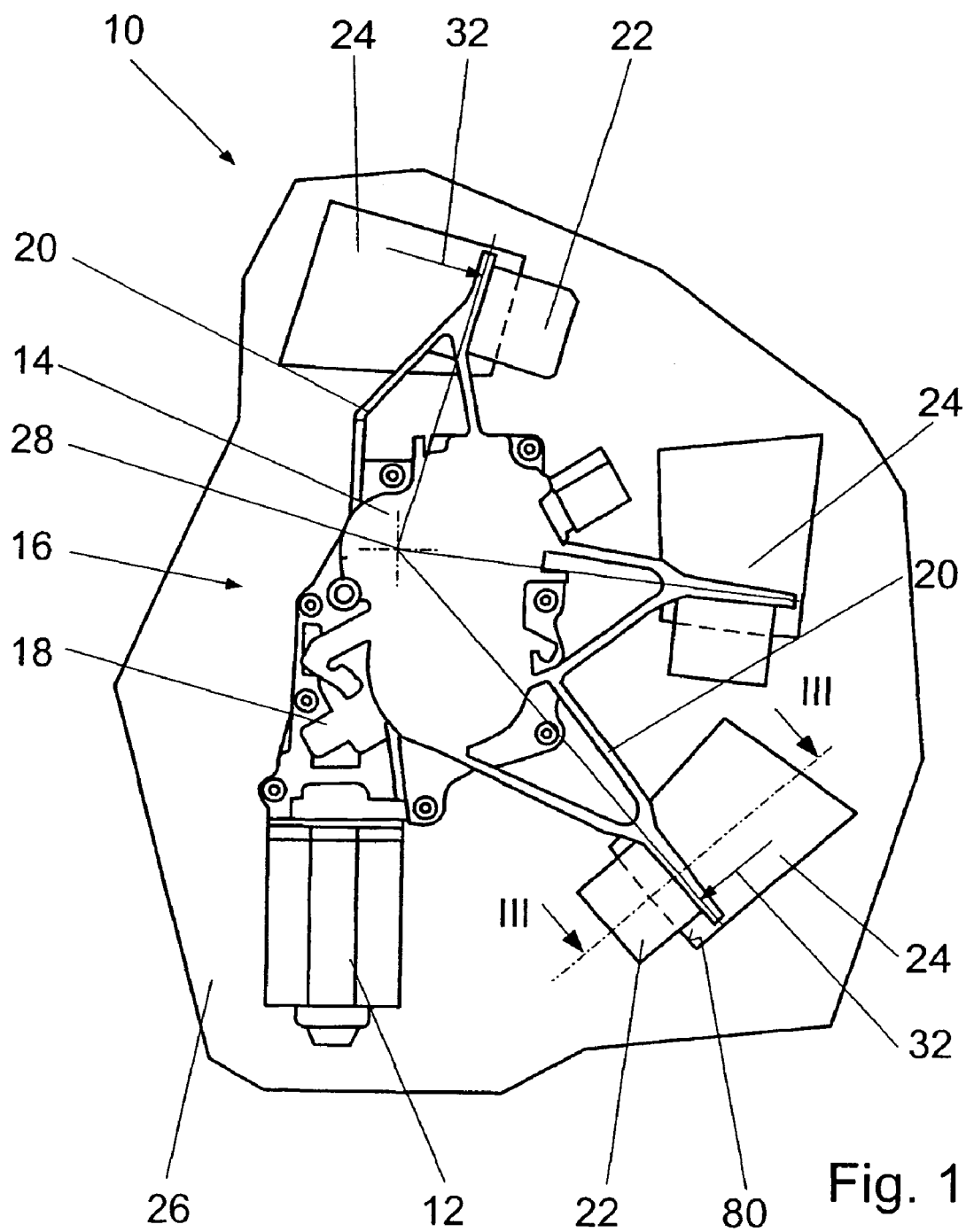
FIG. 1 A schematic representation of a drive device of a windshield wiper device in accordance with the invention.
Figure 1A:
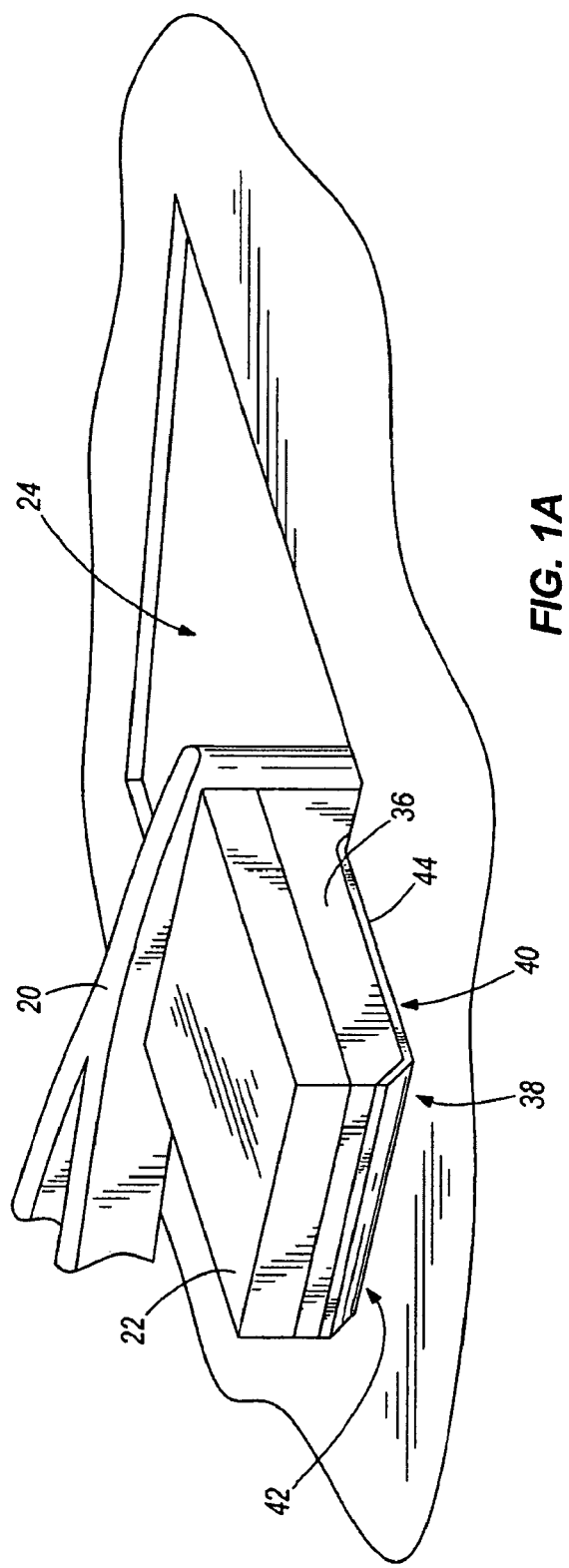
FIG. 1A A partial perspective view of a portion of the drive device shown in FIG. 1.
Figure 2:
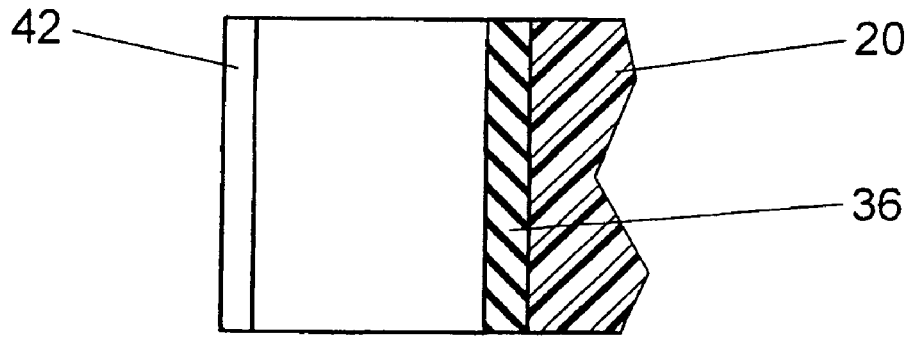
FIG. 2 A longitudinal section through a fastening element in accordance with Line II-II in FIG. 3.
Figure 3:
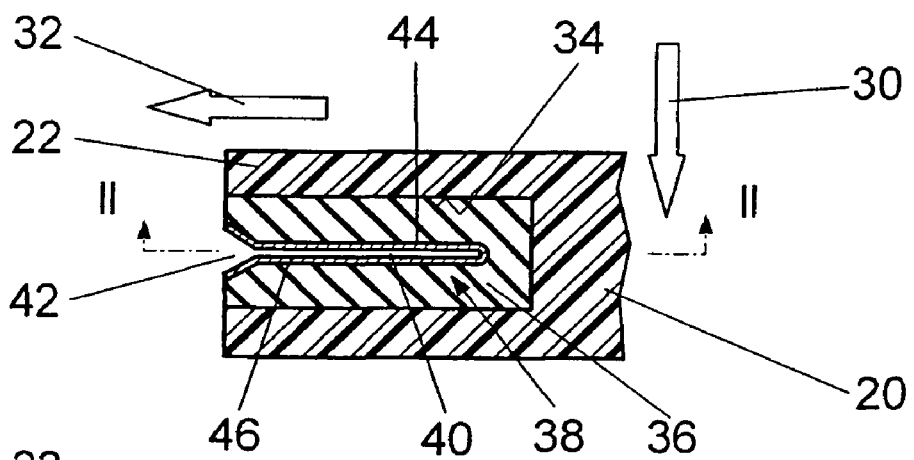
FIG. 3 A section in accordance with Line III-III in FIG. 1.

FIG. 1 shows a schematic representation of a windshield wiper device 10 of a rear windshield wiper of a motor vehicle. Naturally, the invention is in no way limited to rear windshield wipers. It can be used without a problem on front windshield wipers. The windshield wiper device 10 includes an electric motor 12 with a gear 14, which together form a drive element 16. The drive element 16 has a housing 18, which has fastening arms 20. It can be manufactured of plastic in an injection molding method or of metal in a diecasting method. Fastening elements 22 with a U-shaped profile are formed on the ends of the fastening arms 20.

A damping element 36 is inserted into a free space 34 of the U-shaped profile of the fastening element 22 and is firmly connected to the fastening element 22. Approximately in the center, the damping element 36 according to FIG. 1 has a bow 38 with a slot 40 between two legs 44 and 46 that run approximately parallel.

Each fastening element 22 is inserted in a first assembly direction 30 into a receptacle opening 24, which are apertures on an outer panel of the vehicle body 26 in three radial locations aligned with the axis of the output drive 28. The first assembly direction 30 runs approximately perpendicular to the plane of projection of FIG. 1 and axially parallel to the output drive 28 so that the opening of the slot 40 is opposite from an edge of the assembly opening 24. Then, the fastening element 22 is moved in a second assembly direction 32, which corresponds in the embodiment according to FIG. 1 to a rotational movement around the output drive 28, wherein the slot 40 overlaps the edge of the receptacle opening so that the windshield wiper device 10 is held on the vehicle body 26 by the slot 40 and at the same time is vibrationally isolated from the vehicle body 26 by the damping element 36. During assembly, the bow 38, which has a harder surface than the damping element 36, glides easily over the body panel of the vehicle body 26. Furthermore, assembly is facilitated by the fact that the slot 40 has a wedge-shaped expansion 42 at its opening in the second assembly direction 32, through which expansion of the damping element 36 allows the edge 80 of the receptacle opening itself to securely reach the slot 40 even in the case of an imprecise alignment of the fastening element 22 and is held there with an initial stress.

Figure 4:
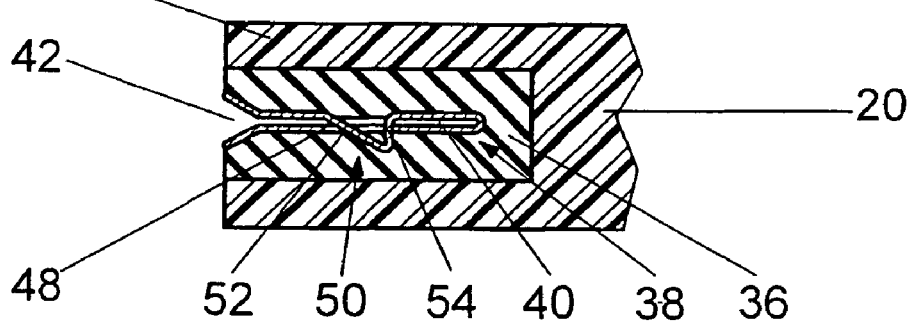
FIG. 4 and FIG. 5 A variation of FIG. 3.

The windshield wiper device 10 can be fixed in the final position in the second assembly direction 32 in any manner, e.g., by a locking screw or a rivet. However, this is accomplished expediently by using a locking nose 50, which is formed on the one leg 44 of the bow 38 and penetrates an opening 48 in the opposing leg 46 (FIG. 4). If the edge 80 of the receptacle opening 24 is pushed through the wedge shaped expansion 42 into the slot 40, it presses the locking nose back via a flat running flank 52, wherein the dampening element 36 yields accordingly. Once the edge 80 of the receptacle opening 24 reaches its end position, the locking nose 50 locks in a locking opening, which is arranged offset from the receptacle opening 24 in the second assembly direction 32. A steeper flank 54 on the side of the locking nose 50 opposite from the second assembly direction 32 guarantees a secure fixation of the windshield wiper device 10.

Figure 5:
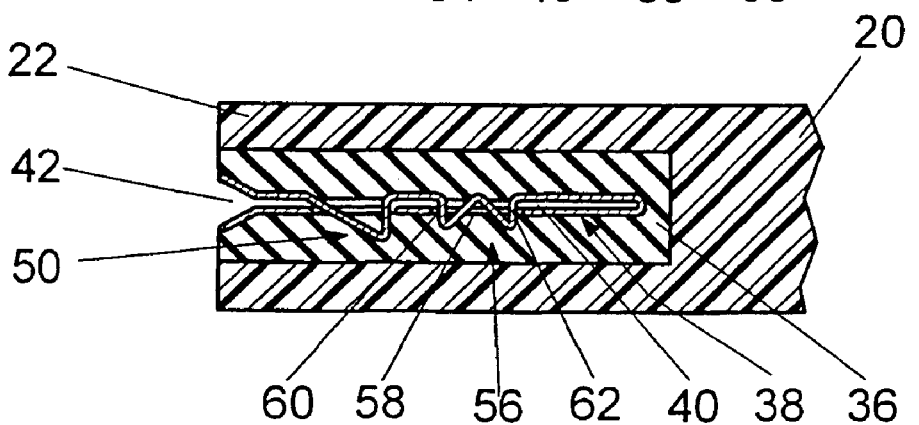

In the case of the embodiment according to FIG. 5, the bow 38 has a second locking nose 56, which is situated behind the first locking nose 50 in the second assembly direction 32. It is delimited by two steep flanks 60, 62 in the second assembly direction 32, which flanks engage in an opening 58 of the opposing leg 46 and enable precise positioning of the windshield wiper device 10 in a corresponding snap-in hole (not shown) of the vehicle body 26. In the process, the first locking nose 50 effects a rough preliminary positioning, while the second locking nose 56 fixes the windshield wiper device 10 with little play in the second assembly direction 32.

Figure 6:
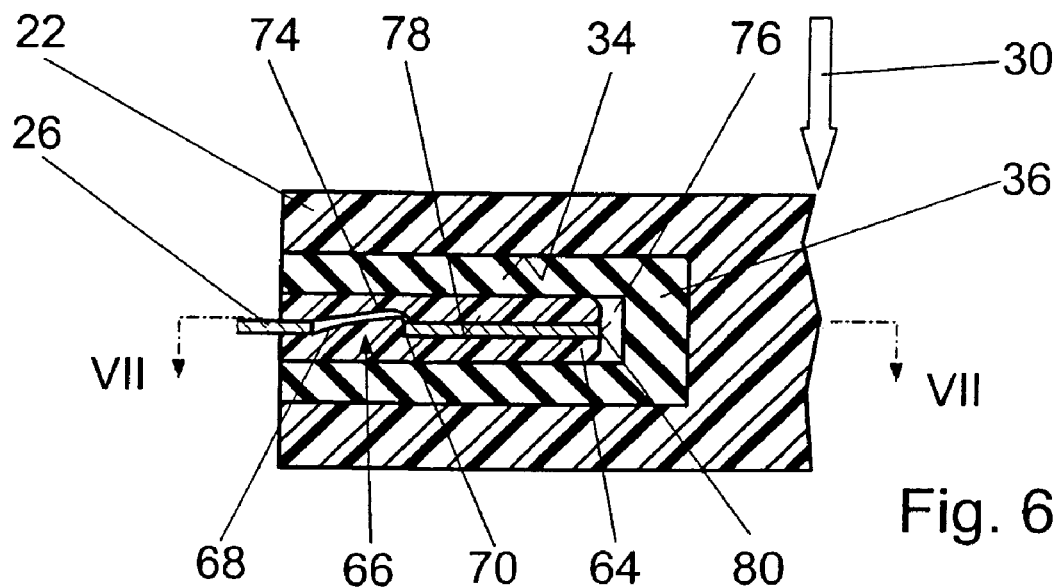
FIG. 6 and FIG. 7 A variation of FIG. 2 and FIG. 3.
Figure 7:
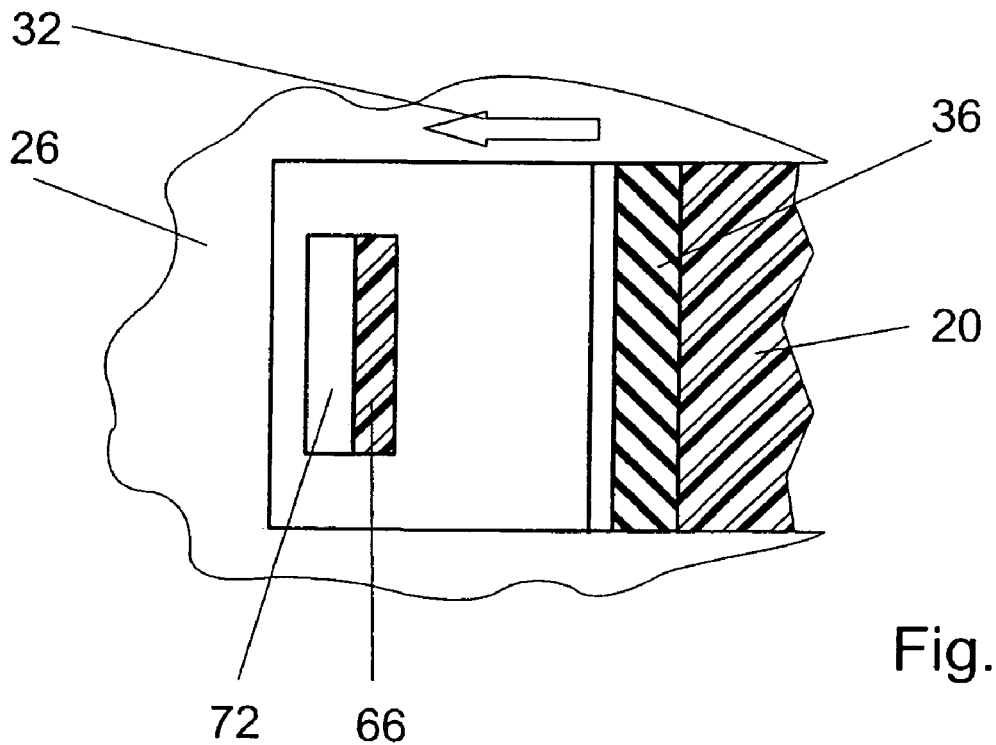

The embodiment according to FIGS. 6 and 7 shows a damping element 36 with a free space 76 into which a holding element 64 made of plastic is inserted. This holding element can be two-piece, whereby the two parts are arranged vis-à-vis each another and are connected firmly with the damping element 36 in such a way that they form a slot 78 between themselves, into which the sheet metal of the vehicle body 26 can be inserted from the edge 80 of the receptacle opening 24. In this case, the slot 78 can also expand towards its opening in a funnel-shaped manner in the second assembly direction 32. The holding element 64 has a locking nose 66 on a surface pointing towards the slot 78, which locking nose in a mounted state engages through a locking opening 72 in the body 26 and then into an indentation 74 on the opposing side of the slot 78. In the second assembly direction 32, the locking nose 66 has a forward, flat-running flank 68 and in the opposing direction a steep-running flank 70. If the edge 80 of the receptacle opening 24 is slid into the slot 78, the locking nose 66 is slid back, whereby the damping element 36 yields. In the final position, when the locking nose 66 locks into place in the locking opening 72, it resumes its initial position and blocks the fastening element in the locking opening 72.

The invention claimed is:

1. Windshield wiper device (10), with at least one drive element (16) having an output shaft (28), and at least two fastening elements (22), which are able to engage in receptacle openings (24) and each having at least one damping element (36) for damping mechanical vibrations, characterized in that the damping element (36) is firmly connected to the fastening element (22) and wherein the damping element (36) and fastening element (22) can be inserted into the receptacle openings (24) in a first assembly direction (30) and via a movement in a second assembly direction (32) transverse to the first edge (80) of the receptacle opening (24), wherein a slot (40) is arranged in a component (38, 64), which has a surface that is hard relative to the damping element (36), and is firmly connected to the damping element (36).

2. Windshield wiper device (10) according to claim 1, characterized in that the component (38, 64) is fabricated of plastic or sheet metal.

3. Windshield wiper device (10) according to claim 1 characterized in that the second assembly direction (32) is a rotational direction around the drive shaft (28) or around an axis parallel to the drive shaft (28) and the locking nose (50, 56, 66) extends radially to the drive shaft (28) or to the parallel axis.

4. Windshield wiper device (10) according to claim 1, characterized in that the component is a holding element (64) made of plastic that is inserted into a free space (76) of the damping element (36), which holding element has a slot (78) for the receptacle of the body panel (26), wherein one side of the slot (78) has a locking nose (66), which projects into an indentation (74) on the opposing side of the slot (78).

5. Windshield wiper device (10) according to claim 4 characterized in that the second assembly direction (32) is a rotational direction around the drive shaft (28) or around an axis parallel to the drive shaft (28) and the locking nose (50, 56, 66) extends radially to the drive shaft (28) or to the parallel axis.

6. Windshield wiper device according to claim 1, characterized in that the slot (40) is at least partially defined by a bow (38), is open in the second assembly direction (32) and has an expansion (42) at the opening of the slot (40).

7. Windshield wiper device (10) according to claim 6, characterized in that the bow (38) has two legs (44, 46) running essentially parallel, which delimit the slot (40) and one of the legs (44) has a locking nose (50), which engages in an opening (48) of the opposing leg (46).

8. Windshield wiper device (10) according to claim 7, characterized in that the locking nose (50) has a flatter flank (52) in the second assembly direction (32) and a steeper flank (54) opposing the second assembly direction (32).

9. Windshield wiper device (10) according to claim 8, characterized in that the bow (38) has a second locking nose (56), which lies behind the first locking nose (50) in the second assembly direction (32) and engages in an opening (58) of the opposing leg (46) with two steep flanks (60, 62) that run transverse to the second assembly direction (32).

10. Windshield wiper device (10) according to claim 9, characterized in that the second locking nose (56) has an M-shaped or W-shaped form in the longitudinal section of the bow (38).

11. Windshield wiper device (10) according to claim 10, characterized in that the bow (38) is fabricated of plastic or sheet metal.

* * * * *